United States Patent
Marinelli

[15] 3,705,732
[45] Dec. 12, 1972

[54] TRAILER CONSTRUCTION
[72] Inventor: Joseph A. Marinelli, New Castle, Pa.
[73] Assignee: City Weldings & Manufacturing Co., Inc.
[22] Filed: Sept. 15, 1971
[21] Appl. No.: 180,562

Related U.S. Application Data
[63] Continuation-in-part of Ser. No. 794,944, Jan. 29, 1969, Pat. No. 3,612,569.

[52] U.S. Cl............280/106 T, 280/423 R, 296/28 M
[51] Int. Cl. .............................................B62d 53/06
[58] Field of Search......280/106 T, 423 R; 296/28 M

[56] References Cited

UNITED STATES PATENTS

| | | | |
|---|---|---|---|
| 3,088,420 | 5/1964 | Faverty | 296/28 M |
| 3,163,461 | 12/1964 | Troy | 296/28 M |
| 3,185,519 | 5/1965 | Turnbull | 280/106 T |
| 3,195,477 | 7/1965 | Jones | 296/28 M |
| 3,319,393 | 5/1967 | Tantlinger | 296/28 M |
| 3,612,569 | 10/1971 | Marinelli | 280/106 T |

*Primary Examiner*—Leo Friaglia
*Assistant Examiner*—Vincent Hom
*Attorney*—Clarence A. O'Brien and Harvey B. Jacobson

[57] ABSTRACT

A combined vehicle frame and load bed construction including a pair of elongated generally parallel longitudinal beams interconnected at points spaced longitudinally therealong by means of a plurality of transverse beam members extending and secured therebetween. The construction further includes outboard transverse brace members secured to and projecting endwise outwardly from the remote sides of the longitudinal beams and the outer ends of the transverse brace members are innerconnected by means of longitudinal rail members secured thereto. A plurality of side-by-side longitudinally extending and longitudinally staggered decking members are secured over the transverse beam members and brace members and the upper surfaces of the longitudinal beams are spaced above the upper surfaces of the transverse beam members. The brace members and the decking members are sufficient in vertical thickness to project slightly above the longitudinal beams when secured to the transverse beam members and brace members and include panel-like portions of reduced vertical thickness extending over the longitudinal beams in order that a substantially planar decking surface is provided with substantially all portions of the decking members solidly supported from beneath by either the transverse beam members and brace members or the longitudinal beams.

11 Claims, 5 Drawing Figures

PATENTED DEC 12 1972

Joseph A. Marinelli
INVENTOR.

BY *Clarence A. O'Brien*
*and Harvey B. Jacobson*
Attorneys

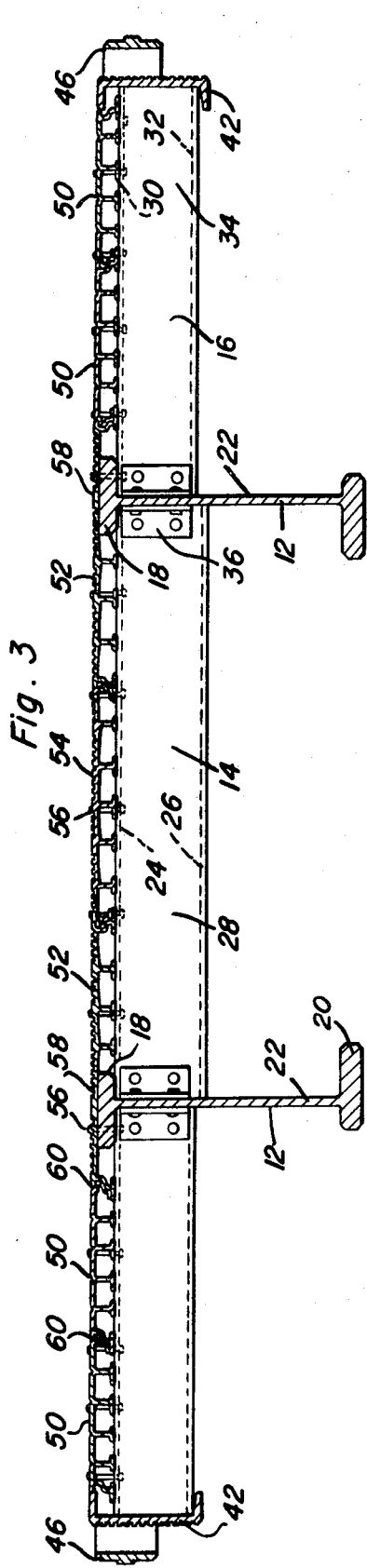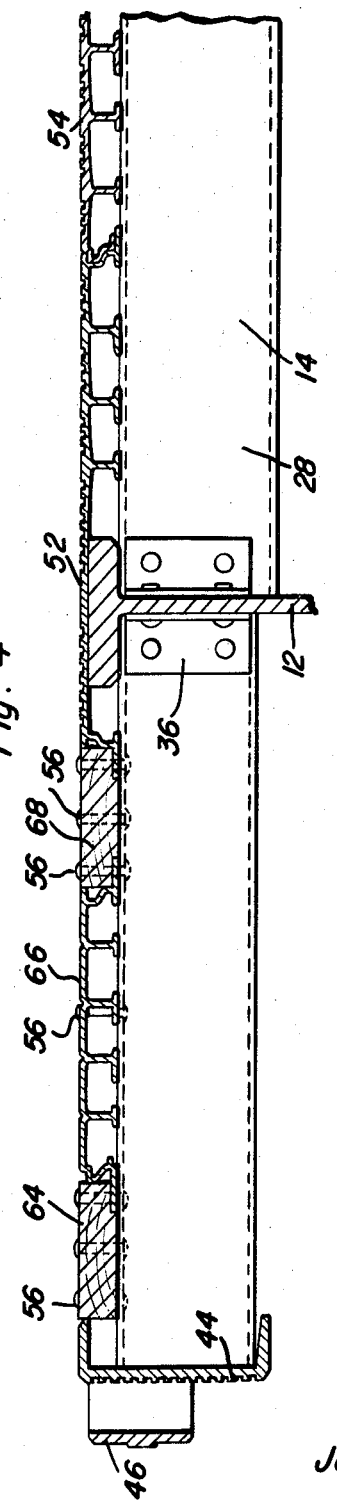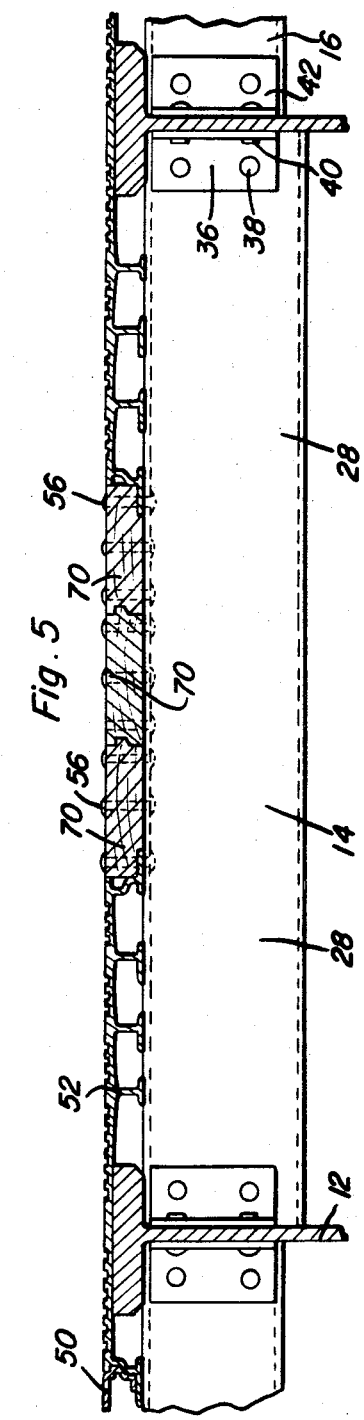

TRAILER CONSTRUCTION

This application comprises a continuation-in-part of my copending application Ser. No. 794,944, filed Jan. 29, 1969, for Trailer Construction and now U.S. Pat. No. 3,612,569.

The combined vehicle frame and load bed construction of the instant invention has been specifically designed to provide an extremely durable, strong and lightweight load bed construction for an over-the-road type of the vehicle. However, the load bed construction of the instant invention may be incorporated into other types of vehicles as well as stationary structures.

In addition, the combined frame and load bed construction functions to tie the longitudinal frame members of the vehicle frame and the decking members together in a manner whereby the decking members serve to structurally reinforce the longitudinal frame members.

The main object of this invention is to provide a combined vehicle frame and load bed construction that may be readily incorporated into over-the-road trailer-type vehicle load beds in order to provide a lightweight load transporting vehicle of high load carrying capacity.

Another object of this invention is to provide a combined vehicle frame and load bed construction in accordance with the preceding object and including structural components specifically designed to utilize lightweight aluminum components which may be readily fabricated and assembled with a minimum amount of labor cost.

Still another object of this invention is to provide a combined frame and load bed construction wherein the decking members of the load bed are also utilized to reinforce the longitudinal frame members of the construction in a manner increasing the load capacity of the over-all combination.

A final object of this invention to be specifically enumerated herein is to provide a combined vehicle frame and load bed construction which will conform to conventional forms of manufacture, be of simple construction and easy to assemble, so as to provide a device that will be economically feasible, long-lasting and trouble-free in fabrication.

These together with other objects and advantages which will become subsequently apparent reside in the details of construction and operation as more fully hereinafter described and claimed, reference being had to the accompanying drawings forming a part hereof, wherein like numerals refer to the like parts throughout, and in which:

FIG. 3 is an enlarged fragmentary transverse vertical sectional view taken substantially upon the plane indicated by the section line 3—3 of FIG. 1 and illustrating a first form of decking construction;

FIG. 4 is a somewhat further enlarged fragmentary transverse vertical sectional view similar to the left-hand portion of FIG. 3 and illustrating a second form of decking construction; and FIG. 5 is a fragmentary vertical sectional view similar to FIG. 4 but illustrating a third form of decking construction.

Figure 1:
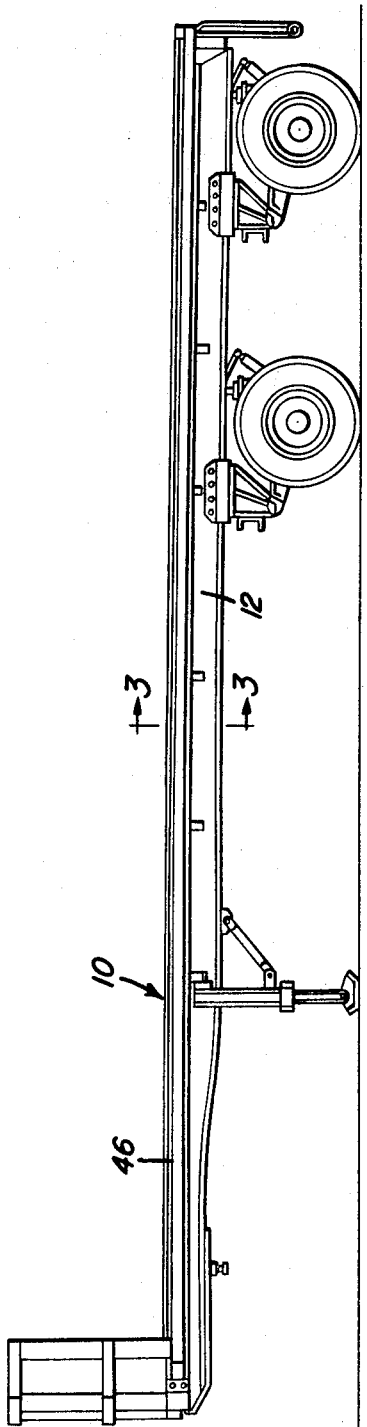
FIG. 1 is a side elevational view of a semi-trailer incorporating the combined structural components of the instant invention therein.

Referring now more specifically to the drawings, the numeral 10 generally designates a semi-trailer constructed in accordance with the present invention.

The semi-trailer 10 includes a main frame consisting of a pair of opposite side longitudinal main I-beams 12 and a plurality of longitudinally spaced and transversely extending transverse beam members 14 extending and secured between the adjacent sides of the main beams 12. Also, the frame of the semi-trailer 10 includes sets of elongated opposite side transverse brace members secured to the outer sides of the main beams 12 at points spaced longitudinally therealong and projecting endwise outwardly from the main beams 12.

The main beams 12 include upper and lower horizontal flanges 18 and 20 innerconnected by means of a central upstanding web 22 and the beam members 14 comprise channel members including upper and lower flange portions 24 and 26 innerconnected by means of an upstanding bight portion 28. Still further, the brace members 16 are also channel shaped and include upper and lower flange portions 30 and 32 innerconnected by means of an upstanding bight portion 34.

The ends of the beam members 14 are secured to the adjacent sides of the webs 22 of the beams 12 by L-shaped brackets 36 riveted to the bight portion 28 as at 38 and to the web 22 as at 40. Also, the inner ends of the brace member 16 are secured to the outer surfaces of the webs 22 by means of similar L-shaped brackets 42.

The outer ends of the brace members 16 are innerconnected by means of channel shaped side rails 44 in which the outer ends of the brace members 16 are secured. The rails 44 are channel shaped and a peripheral rub rail construction 46 is secured outwardly of and extends peripherally along the side rails 44.

It will be noted that the upper flanges 24 and 30 of the beam and brace members 14 and 16 closely underlie the flange 18 in surface-to-surface engagement therewith. Accordingly, the upper surfaces of the flanges 18 are spaced above the upper surfaces of the flanges 24 and 30.

Figure 2:
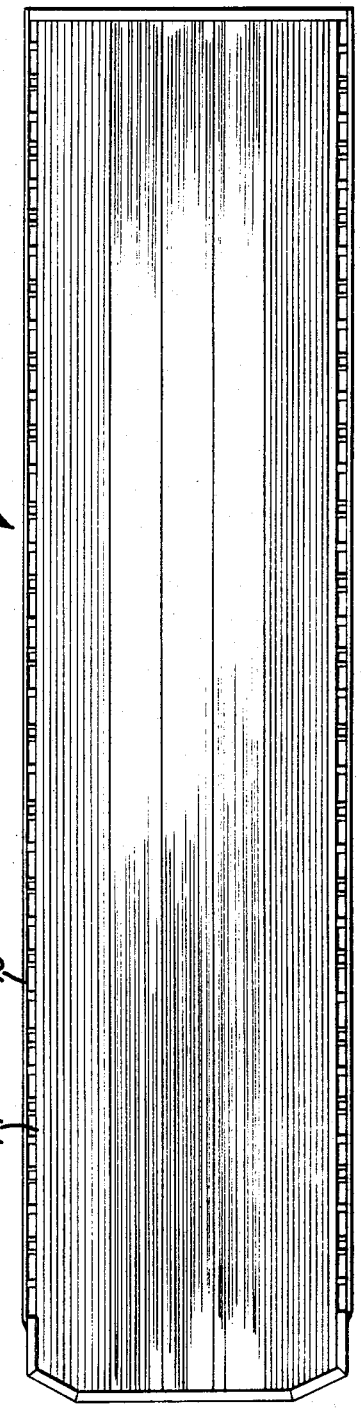
FIG. 2 is a top plan view of the semi-trailer.

With attention now directed more specifically to FIGS. 2 and 3 of the drawings, it may be seen that a plurality of elongated decking sections 50, 52 and 54 are disposed in side-by-side relation transversely of the semi-trailer 10 and secured by rivets 56 to the upper flanges 24 and 30 and also the flanges 18 of the I-beams 12.

The decking sections 52 each have central portions 58 thereof which are of reduced vertical thickness and extend over the upper flanges 18 of the beams 12 in surface-to-surface contacting engagement therewith. In addition, the adjacent side marginal edge portions of the decking sections 50, 52 and 54 include vertically lapped joints 60 for assisting in tieing the decking sections 50, 52 and 54 to each other and the transverse beam and brace members 14 and 16.

With attention now directed more specifically to FIG. 4 of the drawings, there will be seen a modified form of trailer construction which is identical in all instances to the semi-trailer 10 except for the decking sections thereof. The semi-trailer of FIG. 4 includes the decking sections 52 and 54 of the semi-trailer illustrated in FIG. 3. However, the decking sections 50 of the semi-trailer in FIG. 3 are replaced by alternating wooden and aluminum decking sections 64, 66 and 68. Of course, the decking sections 52, 64, 66 and 68 of the semi-trailer illustrated in FIG. 4 include adjacent vertically lapped marginal portions.

With reference now more specifically to FIG. 5, there may be seen a still further modified form of decking construction which includes the decking sections 50 and 52 but utilizes wooden decking sections 70 in lieu of the decking sections 54 of the semi-trailer illustrated in FIG. 3. Otherwise, the semi-trailers disclosed in FIGS. 4 and 5 are substantially identical to the semi-trailer of FIG. 3.

In using the rivets 56 to secure the various decking sections 50, 52 and 54 in place, the rivets 56 disposed along the marginal edges of the decking sections 50, 52 and 54 are secured to the rearmost beam and brace members 14 and 16 and also every other beam and brace member spaced toward the forward end of the semi-trailer 10 while the other rivets securing the decking sections 50, 52 and 54 in place are secured to the next to the rearmost beam and brace members 14 and 16 and also every other set of beam and brace members 14 and 16 spaced toward the forward end of the semi-trailer 10. Of course, similar rivets 56 are also utilized to secure the various decking sections of the semi-trailers illustrated in FIGS. 4 and 5 of the drawings in substantially the same manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combined vehicle frame and load bed construction including a pair of elongated generally parallel longitudinal main beams, a plurality of transverse beam members extending and secured between corresponding longitudinally spaced portions of said main beams with their upper edges spaced below the upper edges of said main beams, a pair of sets of elongated opposite side transverse brace members secured to and projecting endwise outwardly from longitudinally spaced remote side portions of said main beams and also having their upper edges spaced below the upper edges of said main beams, and a plurality of elongated side-by-side decking sections, of generally greater thickness than the vertical spacing between the upper edges of said main beams and the upper edges of said transverse beam and brace members, secured over and to said beam and brace members and including reduced thickness longitudinal plate-like portions extending over and secured to said main beams.

2. The combination of claim 1 wherein said transverse beam members comprise channel members including upper and lower generally horizontal flanges interconnected at one pair of corresponding edge portions by means of a bight portion extending therebetween.

3. The combination of claim 2 wherein said brace members also comprise channel members including upper and lower generally horizontal flanges interconnected at one pair of corresponding edge portions by means of a bight portion extending therebetween.

4. The combination of claim 3 wherein said main beams comprise I-beams having upper and lower horizontal flanges interconnected by means of a central upstanding web, the upper flanges of said transverse beam and brace members underlapping the upper flanges of said I-beams in surface-to-surface engagement therewith.

5. The combination of claim 1 wherein said decking sections are elongated and disposed in side-by-side relation, the confronting side edge portions of adjacent decking sections including vertically overlapped portions.

6. The combination of claim 5 wherein said transverse beam members comprise channel members including upper and lower generally horizontal flanges interconnected at one pair of corresponding edge portions by means of a bight portion extending therebetween.

7. The combination of claim 6 wherein said main beams comprise I-beams having upper and lower horizontal flanges interconnected by means of a central upstanding web, the upper flanges of said transverse beam and brace members underlapping the upper flanges of said I-beams in surface-to-surface engagement therewith.

8. The combination of claim 1 wherein all of said decking sections comprise extruded aluminum panels.

9. The combination of claim 1 wherein said decking sections include a plurality of side-by-side wooden deck sections.

10. The combination of claim 1 wherein said decking section include alternate sections constructed of wood and aluminum spaced transversely of said construction.

11. The combination of claim 1 wherein laterally adjacent decking sections are staggered longitudinally of said construction.

* * * * *